United States Patent [19]

Kato et al.

[11] Patent Number: 4,702,515

[45] Date of Patent: Oct. 27, 1987

[54] SIDE MEMBER OF MOTOR VEHICLE

[75] Inventors: Hisaaki Kato; Shuuji Yamaguchi, both of Susono; Toshiharu Okazaki, Toyota, all of Japan

[73] Assignee: Toyota Jidosha Kabushiki Kaisha, Aichi, Japan

[21] Appl. No.: 874,052

[22] Filed: Jun. 13, 1986

[30] Foreign Application Priority Data

Jun. 17, 1985 [JP] Japan ................................ 60-131352

[51] Int. Cl.⁴ ............................................ B62D 25/00
[52] U.S. Cl. ..................................... 296/189; 188/377
[58] Field of Search ................ 296/189; 293/132, 133; 188/377, 371

[56] References Cited

U.S. PATENT DOCUMENTS

| 3,848,886 | 11/1974 | Feustel et al. | 296/189 |
| 4,272,114 | 6/1981 | Hirano et al. | 293/133 |
| 4,431,221 | 2/1984 | Jahnle | 293/132 |

Primary Examiner—Robert R. Song
Attorney, Agent, or Firm—Parkhurst & Oliff

[57] ABSTRACT

A side member of a motor vehicle in which at least one of four side walls forming a closed tetragon has disposed thereon a plurality of beads extending transverse to the longitudinal direction of said at least one side wall. The beads are shorter than the width of said at least one side wall and are spaced at a pitch of P to $(a+b) \times (1 \pm 0.1)/2$, where b is the transverse length said at least one side wall and a is the transverse length of a side wall adjacent said at least one side wall.

18 Claims, 15 Drawing Figures

SIDE MEMBER OF MOTOR VEHICLE

BACKGROUND OF THE INVENTION

1. Field of the Invention

This invention relates to a side member of a motor vehicle, and more particularly to improvements in a side member of a motor vehicle, wherein an impact energy of impact load in the axial direction applied to the side member can be absorbed by an axial compressive deformation.

2. Description of the Prior Art

There are known side members of a motor vehicle, wherein beads arranged in the longitudinal direction are provided, and, when an impact load in the axial direction is applied, an axial compressive deformation is effected to absorb energy of the impact load.

However, generally, these conventional side members have been improper in shape, length of beads or pitch in the axial direction thereof, so that it is difficult to stably effect the axial compressive deformation.

For example, normally a side member forms a closed section of a rectangular form. However, when the beads are formed, crossing the opposing corner portions in the vertical direction on one side surface of the side member, the bending strength of the side member is reduced considerably, such that when an impact load is applied to the side member in the axial direction, the side member is bent before the side member is axially compressively deformed over the scope of the total length thereof. The reason for this disadvantage is that when a bending moment acts on a tetragonal closed-section member, the stress caused by this bending moment is mainly borned by the corner portions of the tetragon. As a consequence, when the beads are formed at the corner portions bearing a large part of the stress, the bending stress must be borne by the other portions, causing the bending strength of the side member to be lowered considerably.

Figure 11:
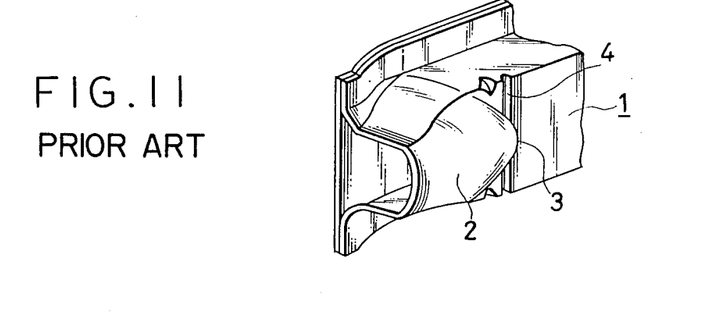
FIG. 11 is a perspective view showing the state where the initial axial compressive deformation is caused to the conventional side member of a motor vehicle.

Furthermore, when the pitch of the beads is improper, as shown in FIG. 11 for example, a disadvantage is presented such that an end portion 3 of an expansive deformation portion 2 of the side member 1, which has initiated an axial compressive deformation, irregularly extends in the direction of the deformation, such that a stable axial compressive deformation cannot be obtained.

SUMMARY OF THE INVENTION

An object of the present invention is to provide a side member of a motor vehicle, wherein a high resistant force is applied to a bending stress caused when an impact load in the axial direction is applied, so that the side member is not easily bent.

Another object of the present invention is to provide a side member of a motor vehicle, wherein when an axial compressive deformation is effected by an impact load in the axial direction, portions to become troughs and portions to become ridges on the side wall are specified to effect stable axial compressive deformation.

To achieve the above-described objects, the present invention contemplates that, in a side member of a motor vehicle forming at least two side walls of a tetragonal closed section and disposed substantially horizontally in the longitudinal direction of a vehicle body in the vertical section of the vehicle body, at least on one side wall of the two adjacent side walls out of the four side walls, forming the closed section, a plurality of beads, each of which is shorter than the length of the one side wall in a direction perpendicularly intersecting the axis of the side member and not reaching the opposing corner portions of the one side wall, are arranged at a pitch of $P=(a+b)\times(1\pm0.1)/2$, where a is the length of the one side wall of the tetragon and b is the length of the other side wall.

To the above end, the present invention contemplates that the beads comprise a first group of beads concaved inwardly into the closed section and a second group of beads convexed outwardly from the closed section with a pitch half shifted from the first group of beads.

To the above end, the present invention contemplates that some beads convexed inwardly are suitably removed and corner beads are formed at corner portions of opposite side portions of the bead-lacking positions.

To the above end, the present invention contemplates that corner beads are formed at intermediate positions between the beads convexed outwardly from the above-described beads and at positions where the beads convexed outwardly are lacking.

To the above end, the present invention contemplates that when a cross-section of a member including the side member and forming the closed section is symmetrical with respect to the vertical center line thereof, the beads are formed on the opposing vertical side walls of the tetragon at the same pitch in the axial direction of the side member and at the same phase.

To the above end, the present invention contemplates that when the cross-section of the member including the side member and forming the closed section is not substantially symmetrical with respect to the vertical center line thereof, the beads are formed on the opposing vertical side walls of the tetragon at the same pitch and at a phase shift of ½.

According to the present invention, the length of the beads is formed so as not to reach the corner portions of the side walls where the beads are formed. Therefore, when a load acts on the side member in the axial direction, the corner portions bear the bending stress, so that the bending strength is increased to obtain a stable axial compressive deformation.

The pitch of the beads in the axial direction of the side member is specified by the height and the width of the tetragon of the closed section of the side member. When a load in the axial direction is applied, the deformation of the side member is specified in the portions which become troughs and ridges, depending on the respective beads, so that stable axial compressive deformation can be obtained.

DETAILED DESCRIPTION OF THE PREFERRED EMBODIMENTS

A description will hereunder be given of the embodiments of the present invention with reference to the drawings.

Figure 1:
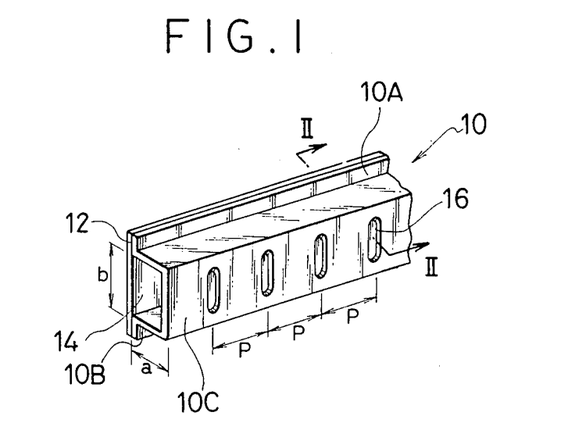
FIG. 1 is a perspective view showing one embodiment of the side member of a motor vehicle according to the present invention.
Figure 2:
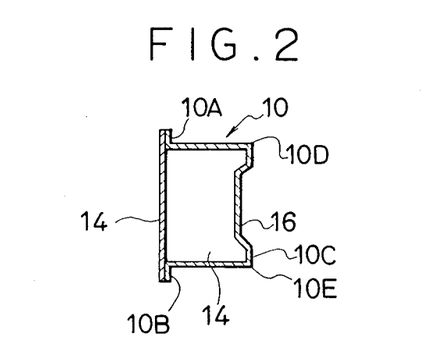
FIG. 2 is an enlarged sectional view taken along the line II—II in FIG. 1.

As shown in FIGS. 1 and 2, the first embodiment of the present invention is such that, in a rectangular closed section 14 having a width a and a height b and formed by a side member 10 and a panel 12 blocking an opening of the side member 10 and welded to upper and lower flanges 10A and 10B and formed of, for example, a fender panel, a plurality of beads 16, each of which has a length shorter than the length of the vertical side wall 10C in the vertical direction and each of which do not reach corner portions in the vertical direction on the vertical side wall 10C, are arranged on the vertical side wall 10C opposed to the panel 12 at a predetermined pitch P in the axial direction of the side member 10.

The pitch P of the beads 16 in the axial direction of the side member 10 is determined by the following equation, in accordance with the width a and the height b of the closed section 14:

$$P = (a+b) \times (1 \pm 0.1)/2 \tag{1}$$

If the length of the beads 16 is shorter than the vertical side wall 10C and does not reach the upper and the lower corner portions 10D and 10E as described above, then the bending stress, caused when an impact load in the axial direction of the the side member 10 acts on the side member 10, mainly borne by the corner portions 10D and 10E, so that the bending rigidity is increased, the side member 10 is not easily bent and a stable axial compressive deformation is generated to the load in the axial direction.

Figure 3:
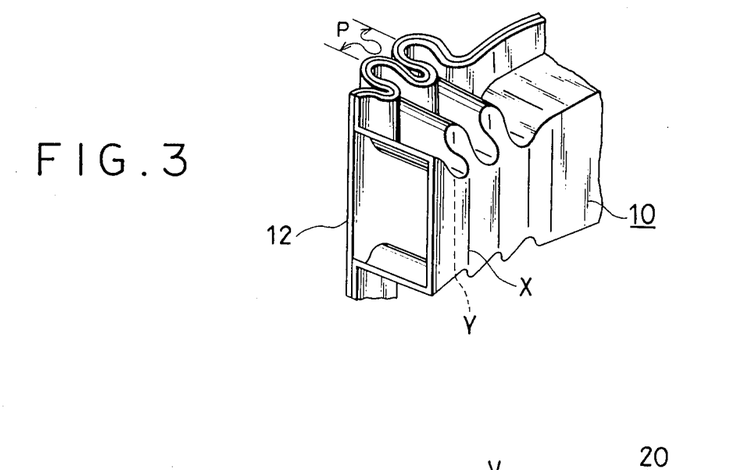
FIG. 3 is a perspective view showing the state where the side member is deformed when an impact load in the axial direction of the side member is applied thereto.

Furthermore, according to the above-described equation (1), it has been determined by the experiments conducted by the inventors of the present invention that, when a load in the axial direction is applied to the side member 10, a bulged-out portion of the side member 10 caused by the axial compressive deformation does not extend irregularly, the pitch of the beads is not increased, the portions expanded outward by and the portions recessed into the side member 10, i.e. positions of ridge lines X and trough lines Y are regulated and the portions becoming the troughs and the ridges can be most suitably specified (Refer to FIG. 3).

Figure 12:
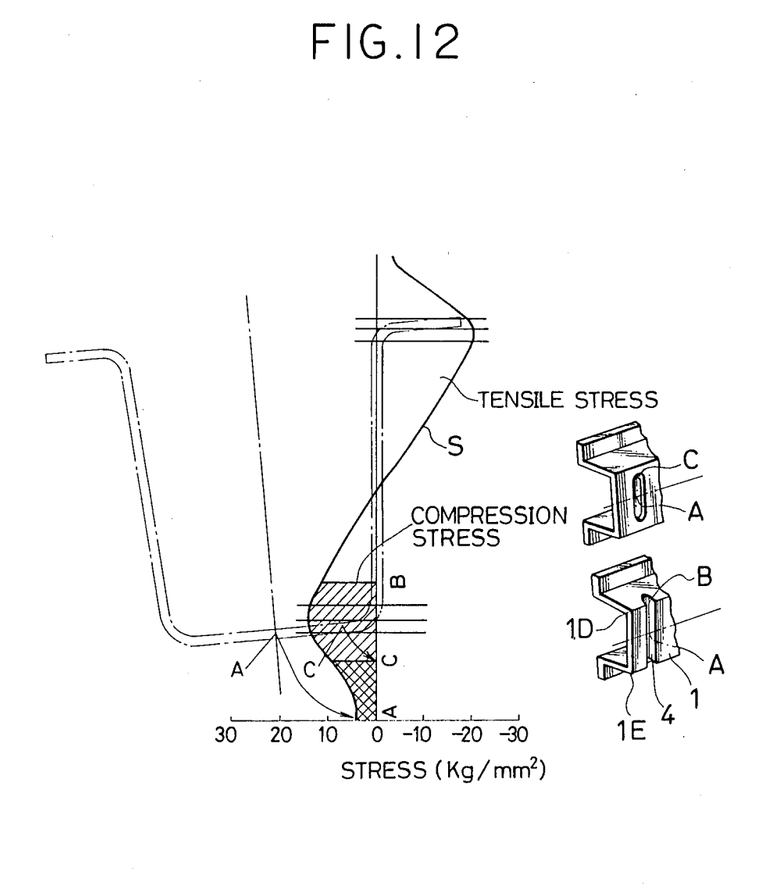
FIG. 12 is a chart showing the relationship between the bending stress applied to the side member and the sectional shape of the side member.

Specifically, when the axial load acts on the side member 1 having the cross-section shown in FIG. 11, the bending stress thus caused is shown by a solid line S in FIG. 12. As shown in FIG. 12, when the bead 4 is formed so as to cover the total scope of the side wall 1 and reaching the corner portions at the opposite sides, the stress borne by the wall between points A and B as shown in FIG. 12 becomes extremely low.

On the other hand, as shown in FIGS. 1 and 2, when the beads 16 are formed so as not to reach the corner portions 10D and 10E of the vertical side wall 10C as in the above embodiment, the bending stress can be borne by the portion of the wall between two points B and C as shown in FIG. 12. As a result, the bending rigidity is increased relative to the case in which the beads 4 are provided as in FIG. 1.

Figure 4:
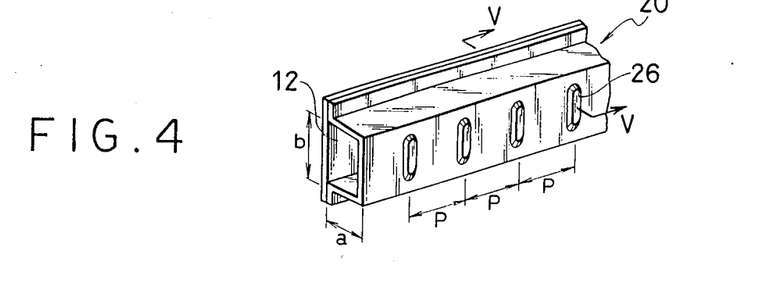
FIG. 4 is a perspective view showing a second embodiment of the present invention.
Figure 5:
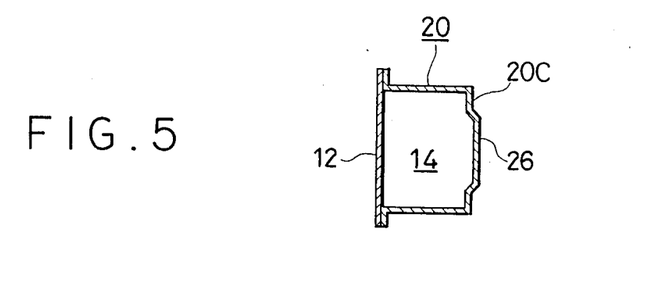
FIG. 5 is an enlarged sectional view taken along the line V—V in FIG. 4.

Description will hereunder be given of the second embodiment of the present invention as shown in FIGS. 4 and 5.

In this second embodiment, beads 26 convexed outwardly are formed on a side member 20 having a shape similar to the side member of the first embodiment.

The other aspect of this embodiment is identical to the ones in the first embodiment, so that the same reference numerals are used and the description will not be repeated.

The major difference between the second embodiment and the first embodiment is that, in the first embodiment, when the axial load is applied to the side member 10, the side wall 10C having the beads in the side member 10 is inwardly deformed at the positions of the beads 16. In the second embodiment, however, when the axial load is applied to the side member 20, the side wall 20C having the beads in the side member 20 is outwardly deformed at the positions of the beads 26.

Figure 6:
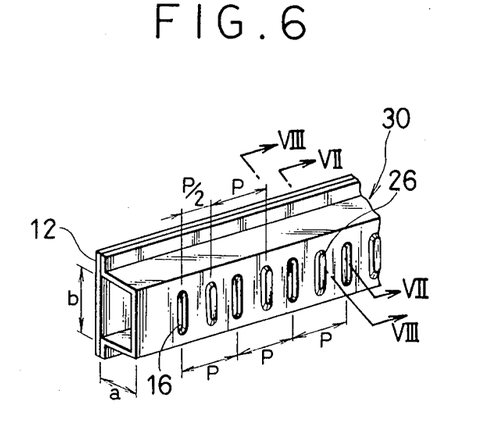
FIG. 6 is a perspective view showing a third embodiment of the present invention.
Figure 7:
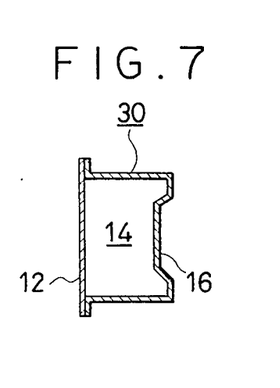
FIGS. 7 and 8 are enlarged sectional views taken along the lines VII—VII and VIII—VIII in FIG. 6.
Figure 8:
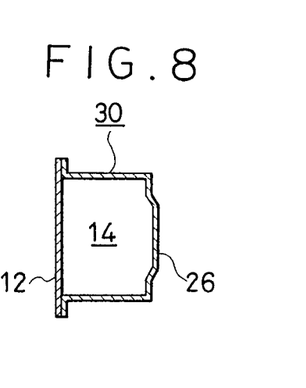

A description will hereunder be given of the third embodiment of the present invention shown in FIGS. 6 to 8.

In this third embodiment, the beads 16, concaved inwardly, and the beads 26, convexed outwardly, are alternately formed on a side member 30 having a shape similar to the one in the first embodiment at a pitch of P/2. As in the first embodiment, the beads 26 convexed outwardly are formed at the positions where beads are bulged outwardly in the first embodiment when the axial compressive deformation is caused.

As a result, the portions to become troughs and ridges in the side member 30 can be regulated and specified more reliably at the time of the axial compressive deformation.

Additionally, the beads 16 and 26 are formed only on the vertical side wall of the side members 10, 20 and 30 each having a laterally directed hut type section, which is opposed to the panel 12. However, the present invention need not necessarily be limited to this, and, for example, there may be adopted to a closed section as shown in FIG. 10, a closed section formed by an angle-shaped side member 50 and an angle-shaped panel 32 as shown in FIG. 13, a closed section wherein a laterally directed U-shaped side member 60 and a laterally directed U-shaped panel 42 overlap at the center position in the widthwise direction as shown in FIG. 14, or a side member 70 singly forming a tetragonal closed section without being connected to a panel or the like as shown in FIG. 15.

The beads may be formed on at least on one side wall out of two opposing side walls. As a result, as in the fourth embodiment shown in FIGS. 9 and 10, beads 36 may be formed on both a side member 40 and a panel 22 connected thereto.

Figure 10:
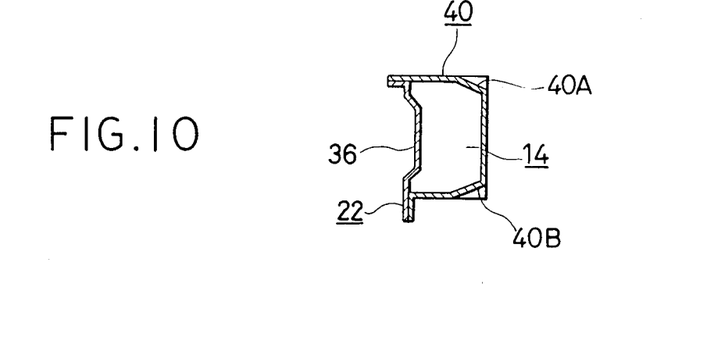
FIG. 10 is an enlarged sectional view taken along the line X—X in FIG. 9.
Figure 13:
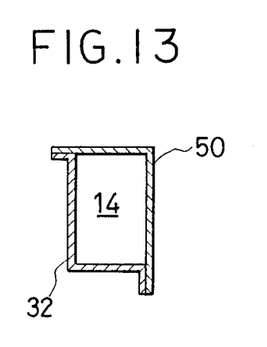
FIGS. 13 to 15 are sectional views showing modifications of the side members, to which is applied the present invention, and the sectional shapes in the connected states between the side members and the panels.

When the beads are formed on the two opposing side walls forming the closed section 14, if the section of the side member or a connected body of the side member and the panel is not symmetrical with respect to the vertical center line thereof as shown in FIGS. 2, 10 and 13, then the beads formed on the two opposing side walls are formed at the same pitch in the axial direction of the side member and at a phase shift of ½.

Figure 14:
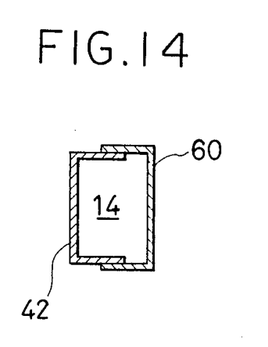
Figure 15:
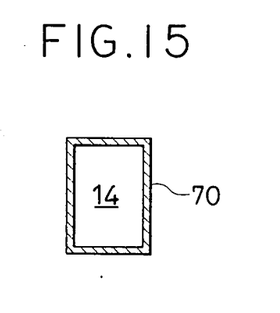

Furthermore, when the section is symmetrical with respect to the vertical center line thereof as shown in FIGS. 14 and 15, the beads are formed at the same pitch in the axial direction of the side member at the same phase.

Figure 9:
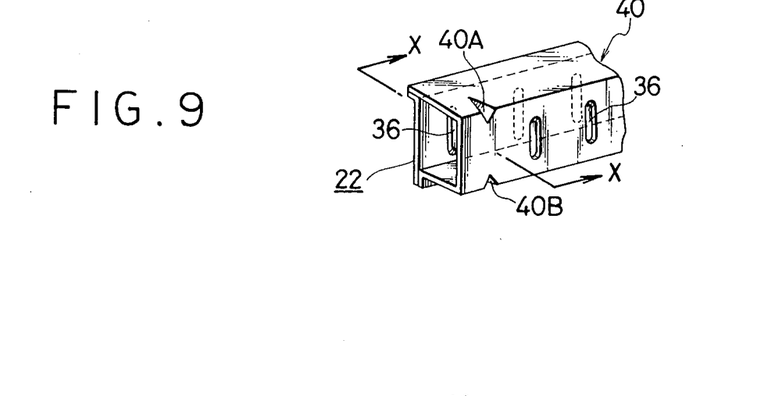
FIG. 9 is a perspective view showing a fourth embodiment of the present invention.

Additionally, as shown in FIGS. 9 and 10 for example, some of the beads on the side member 40 are removed, and instead, corner beads 40A, 40B may be formed at positions of an upper and a lower corner positions.

Here, since the corner beads 40A are concaved outwardly, when the beads formed on the side member are convexed, the corner beads 40A are formed at intermediate positions, i.e. at a phase shift of ½.

What is claimed is:

1. A side member of a motor vehicle, said side member being disposed substantially horizontally in the longitudinal direction of a vehicle body, comprising:
    first, second, third and fourth side walls defining a tetragonal closed section in a vertical section of the vehicle body;
    a plurality of beads on at least one of said side walls, each of said beads extending in a transverse direction to said longitudinal direction and being shorter than the width of said at least one side wall in said transverse direction and not extending to corners defined by said at least one side wall and side walls adjacent to said at least one side wall, said beads being spaced at a pitch of $P=(a+b)\times(1\pm0.1)/2$ where b is the transverse length of said at least one side wall and a is the transverse length of said adjacent side walls.

2. A side member of a motor vehicle as set forth in claim 1, wherein said beads comprise a first group of beads concaved inwardly into the closed section and a second group of beads convexed outwardly from the closed section with a pitch half shifted from the first group of beads.

3. A side member of a motor vehicle as set forth in claim 1, wherein corner beads are formed at positions where said beads convexed outwardly are lacking.

4. A side member of a motor vehicle as set forth in claim 2, wherein corner beads are formed at positions where said beads convexed outwardly are lacking.

5. A side member of a motor vehicle as set forth in claim 1, wherein corner beads are formed at intermediate positions between said beads convexed outwardly at positions where said beads convexed outwardly are lacking.

6. A side member of a motor vehicle as set forth in claim 2, wherein corner beads are formed at intermediate positions between said beads convexed outwardly at positions where said beads convexed outwardly are lacking.

7. A side member of a motor vehicle as set forth in claim 1, wherein, when a cross-section of a member including said side member and forming said closed section is symmetrical with respect to a vertical center line thereof, said beads are formed on opposing vertical walls of said tetragonal closed section at the same pitch in the axial direction of the side member and at the same phase.

8. A side member of a motor vehicle as set forth in claim 2, wherein, when a cross-section of a member including said side member and forming said closed section is symmetrical with respect to a vertical center line thereof, said beads are formed on opposing vertical walls of said tetragonal closed section at the same pitch in the axial direction of the side member and at the same phase.

9. A side member of a motor vehicle as set forth in claim 3, wherein, when a cross-section of a member including said side member and forming said closed section is symmetrical with respect to a vertical center line thereof, said beads are formed on opposing vertical walls of said tetragonal closed section at the same pitch in the axial direction of the side member and at the same phase.

10. A side member of a motor vehicle as set forth in claim 4, wherein, when a cross-section of a member including said side member and forming said closed section is symmetrical with respect to a vertical center line thereof, said beads are formed on opposing vertical walls of said tetragonal closed section at the same pitch in the axial direction of the side member and at the same phase.

11. A side member of a motor vehicle as set forth in claim 5, wherein, when a cross-section of a member including said side member and forming said closed section is symmetrical with respect to a vertical center line thereof, said beads are formed on opposing vertical walls of said tetragonal closed section at the same pitch in the axial direction of the side member and at the same phase.

12. A side member of a motor vehicle as set forth in claim 6, wherein, when a cross-section of a member including said side member and forming said closed section is symmetrical with respect to a vertical center line thereof, said beads are formed on opposing vertical walls of said tetragonal closed section at the same pitch in the axial direction of the side member and at the same phase.

13. A side member of a motor vehicle as set forth in claim 1, wherein, when a cross-sectional shape of said member including said side member and forming said tetragonal closed section is not substantially symmetrical with respect to a vertical center line thereof, said beads are formed on opposing vertical side wall of said tetragonal closed section at the same pitch and at a phase of shift at ½.

14. A side member of a motor vehicle as set forth in claim 2, wherein, when a cross-sectional shape of said member including said side member and forming said tetragonal closed section is not substantially symmetrical with respect to a vertical center line thereof, said beads are formed on opposing vertical side wall of said tetragonal closed section at the same pitch and at a phase of shift at ½.

15. A side member of a motor vehicle as set forth in claim 3, wherein, when a cross-sectional shape of said member including said side member and forming said tetragonal closed section is not substantially symmetrical with respect to a vertical center line thereof, said beads are formed on opposing vertical side wall of said tetragonal closed section at the same pitch and at a phase of shift at ½.

16. A side member of a motor vehicle as set forth in claim 4, wherein, when a cross-sectional shape of said member including said side member and forming said tetragonal closed section is not substantially symmetrical with respect to a vertical center line thereof, said beads are formed on opposing vertical side wall of said tetragonal closed section at the same pitch and at a phase of shift at ½.

17. A side member of a motor vehicle as set forth in claim 5, wherein, when a cross-sectional shape of said member including said side member and forming said tetragonal closed section is not substantially symmetrical with respect to a vertical center line thereof, said beads are formed on opposing vertical side wall of said tetragonal closed section at the same pitch and at a phase of shift at ½.

18. A side member of a motor vehicle as set forth in claim 6, wherein, when a cross-sectional shape of said member including said side member and forming said tetragonal closed section is not substantially symmetrical with respect to a vertical center line thereof, said beads are formed on opposing vertical side wall of said tetragonal closed section at the same pitch and at a phase of shift at ½.

* * * * *